United States Patent [19]

Nelson

[11] Patent Number: 4,730,786

[45] Date of Patent: Mar. 15, 1988

[54] LOW NOISE, FLOW LIMITING, LAMINAR STREAM SPOUT

[76] Inventor: Walter R. Nelson, 8771 Alta Loma Dr., Alta Loma, Calif. 91701

[21] Appl. No.: 892,957

[22] Filed: Aug. 4, 1986

Related U.S. Application Data

[63] Continuation-in-part of Ser. No. 641,042, Aug. 15, 1984, abandoned.

[51] Int. Cl.$^4$ ............................................. B05B 1/14
[52] U.S. Cl. .............................. 239/590.3; 239/590.5
[58] Field of Search .............. 239/428.5, 553.3, 553.5, 239/590.3, 590.5

[56] References Cited

U.S. PATENT DOCUMENTS

| | | | |
|---|---|---|---|
| 2,929,567 | 3/1960 | Aghnides | 239/590.3 X |
| 2,995,308 | 8/1961 | Ashkenaz | 239/590.3 X |
| 3,630,444 | 12/1971 | Nelson | 239/590.3 X |
| 4,119,276 | 10/1978 | Nelson | 239/590.3 |

Primary Examiner—Andres Kashnikow
Assistant Examiner—Mary Beth O. Jones
Attorney, Agent, or Firm—Bogucki, Scherlacher, Mok & Roth

[57] ABSTRACT

A faucet spout attachment is disclosed including a flow-limiting plate having flow-controlling orifices. Downstream of the flow-limiting plate, alternate series of perforated disks and wire screens arrest stream velocity and redistribute the velocity profile of the stream to provide laminar flow. A screen in contact with the downstream surface of the flow-limiting plate suppreses noise. The flow-limiting plate includes a central flow-trimming orifice whose diameter is selected so that the overall flow rate of the device falls just within the lower end of a predetermined flow range thereby maintaining stream-generated noise at a minimum.

24 Claims, 6 Drawing Figures

LOW NOISE, FLOW LIMITING, LAMINAR STREAM SPOUT

CROSS REFERENCE TO RELATED APPLICATION

This application is a continuation-in part of application Ser. No. 641,042 filed Aug. 15, 1984, now abandoned.

This invention relates generally to a faucet spout attachment for modifying the characteristics of the stream flowing through the attachment, and more particularly to a spout attachment for providing a flow-limited laminar stream while minimizing stream-generated noise.

SUMMARY OF THE INVENTION

A spout attachment in accordance with a specific embodiment of the invention includes a flow-limiting plate extending across a flow passage and having a plurality of flow-limiting orifices of predetermined diameter. A screen is disposed across the flow passage in contact with the downstream surface of the flow-limiting plate. This contact relationship has been found to be effective in suppressing stream-generated noise. A plurality of spaced-apart screens are disposed across the flow passage downstream of the first-mentioned screen. Last, a plurality of spaced-apart perforated disks are disposed across the flow passage between the first mentioned screen and the plurality of spaced-apart screens. The screens and perforated disks modify the velocity profile across the diameter of the flow passage to maximize redistribution of stream kinetic energy. A uniform, constant flow velocity is thereby provided across virtually the entire cross-section of the flow passage so as to limit the maximum velocity and thereby produce laminar flow, that is, a soft, clear stream essentially free of turbulence and splash.

Pursuant to another aspect of the invention, the flow-limiting orifices in the flow-limiting plate are arranged in circular arrays about a central trimming orifice. By themselves, the flow-limiting orifices provide a flow rate below a predetermined flow range. The diameter of the trimming orifice is selected to increse the flow rate to place it, for a given pressure, within the low end of the predetermined range. This feature further helps ro reduce noise. In accordance with a specific example of the invention, stream-generated noise does not exceed the 20 decibel limit imposed by certain codes governing plumbing system noise levels.

BRIEF DESCRIPTION OF THE DRAWINGS

A better understanding of the invention, as well as further objects and advantages thereof, may be had from a consideration of the following detailed description taken in conjunction with the accompanying drawings in which.

DETAILED DESCRIPTION OF THE PREFERRED EMBODIMENT

Figure 1:
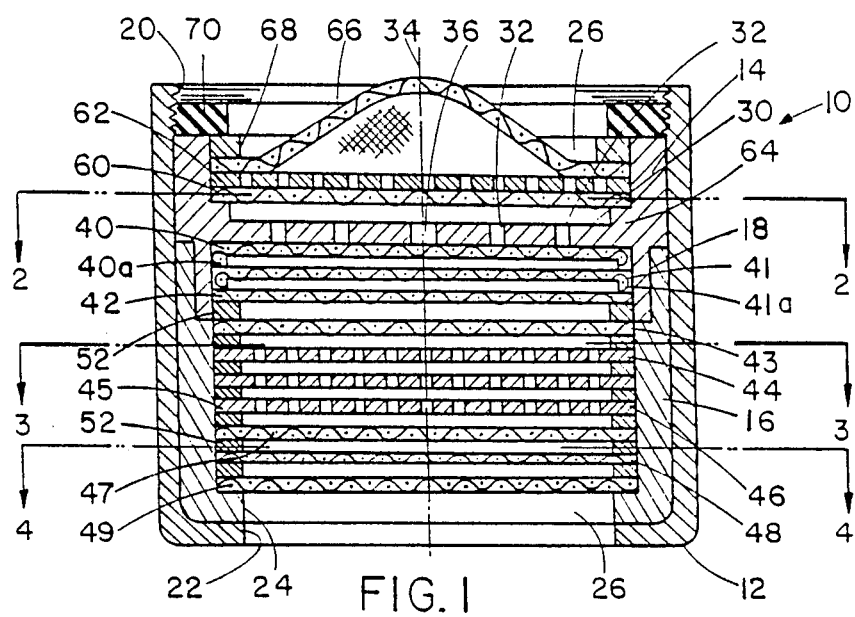
FIG. 1 is longitudinal cross-section of a spout attachment according to a first embodiment of the present invention.
Figure 5:
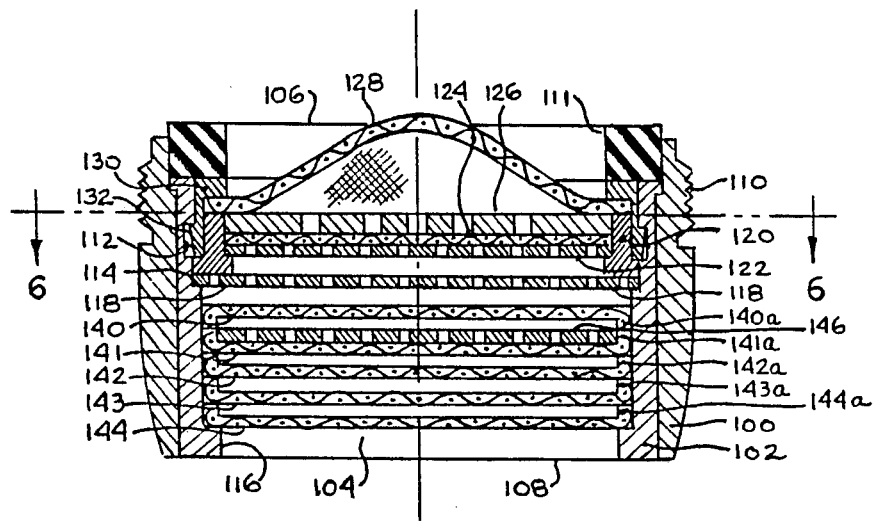
FIG. 5 is a longitudinal cross-section of a spout attachment according to a second embodiment of the present invention.

With reference to FIGS. 1-4 of the drawings, a spout attachment according to a first embodiment the invention includes a cylindrical housing 10 comprising an outer shell 12, an upper cartridge 14 and a lower cartridge 16. The upper and lower cartridges are detachably coupled at a lap joint 18 which facilitates assembly, disassembly and cleaning of the attachment. (It will be understood that the term "upper" and "lower" are not to be construed in a restrictive sense and are used merely in aid of the description of the attachment oriented as shown in FIGS. 1 and 5; the orientation of the device is not, of course, limited to that depicted there).

The mating upper and lower cartridges 14 and 16 fit snugly within the shell 12 which is provided at its upper or inlet end with internal threads 20 for coupling the attachment to a faucet spout. The shell 12 has a lower or outlet end defined by an inwardly-directed flange 22. A similar, inwardly-directed flange 24 on the outlet end of the lower cartridge 16 engages the flange 22 on the housing shell. A central flow passge 26 connects the inlet and outlet ends of the attachment. The inlet and outlet ends are also referred to as the upstream and downstream ends, respectively.

The shell 12 is preferably fabricated of metal while the cartridges are plastic elements best formed by an injection-molding process.

Figure 2:
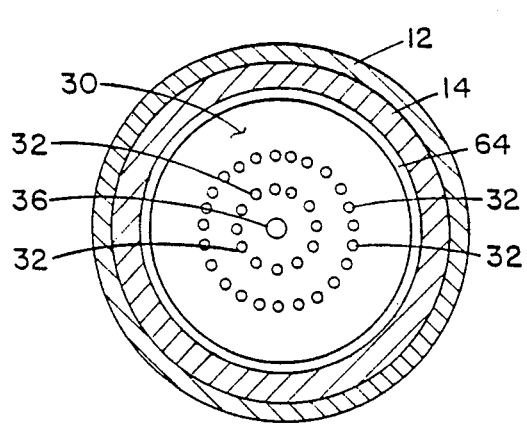
FIGS. 2, 3 and 4 are transverse cross-sections of the device shown in FIG. 1 as seen along the planes 2—2, 3—3 and 4—4, respectively.

Formed as an integral part of the upper cartridge 14 is a transverse flow-limiting plate 30 extending across the flow passage 26. As best seen in FIG. 2, the plate 30 has, in the specific embodiment under discussion, a plurality of orifices 32 lying on a pair of concentric circles. Preferably, the orifices 32 all have the same diameter and in this example, there are thirty-six (36) such orifices, twenty-four (24) of them being spaced at equal intervals along the outer circle and the remaining twelve (12) being equally spaced along the inner circle. These orifice arrays are centered on a longitudinal axis 34 which, of course, is oriented in the direction of fluid flow through the attachment. In the specific example under consideration, the flow-limiting plate has a thickness of 0.028 inch (0.71 mm) and each orifice 32 has a diameter of 0.027 inch (0.69 mm). The flow-limiting plate also includes a central flow trimming orifice 36 whose function will be described later.

To facilitate the description of the device, the lower surface of the flow-limiting plate 30 will also be referred to as the downstream surface while the upper surface will also be referred to as the upstream surface.

Between the downstream surface of the flow-limiting plate 30 and the flange 24 on the outlet end of the lower cartridge 16, are two series of spaced, parallel screens and one series of spaced, parallel perforated disks intercepting the flow passage 26. These screens and disks provide laminar flow and in this respect function as velocity arresting and profile redistribution elements. The result is a velocity profile that is more uniform across the flow passage. For a more detailed description of the function of these elements in producing laminar fluid flow, reference is made to the inventor's earlier U.S. Pat. No. 4,119,276, issued Oct. 10, 1978, for "Laminar Stream Spout Attachment". The screens and disks also reduce noise.

Beginning nearest the flow-limiting plate, a first series of four (4) disk-shaped wire screens 40-43 is followed by three (3) perforated disks 44-46 which in turn are followed by a second series of wire screens 47-49, preferably three (3) in number. The screens and perforated disks are substantially uniformly spaced. Thus, screens and disks 42-49 are separated by seven (7) identical spacer rings 52 while screens 40 and 41 have downturned rims 40a and 41a, respectively, which provide the appropriate separations. It will be seen that the portion of the flow passage 26 downstream of the flow-limiting plate 30 is defined principally by the inner surfaces of the spacer rings 52 which are in substantial alignment to define a relatively smooth cylindrical surface.

The uppermost screen 40 lies immediately adjacent the lower or downstream surface of the flow-limiting plate 30 and is preferably in direct contact with that surface. This placement has been determined to be an important factor in minimizing stream-generated noise.

Figure 3:
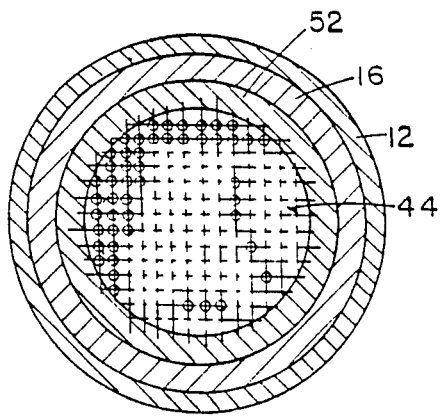
Figure 4:
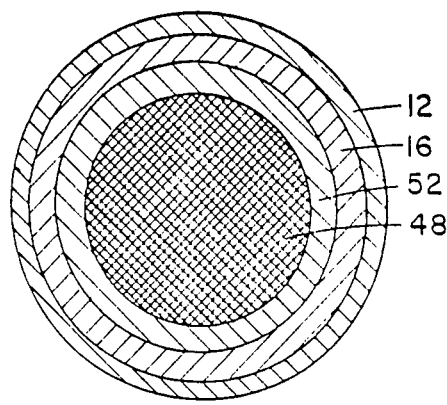

The configuration of each of the perforated disks 44-46 is best shown in FIG. 3. The disks may be made, for example, of brass sheet or strip having a thickness of 0.016 inch (0.41 mm). Each disk includes apertures arranged in a matrix of rows and columns with a uniform center-to-center spacing of about 0.044 inch (1.12 mm) to provide a density of about 516 apertures per square inch (80 apertures per square centimeter). With an aperture diameter of 0.028 inch (0.71 mm), the total area of the apertures is approximately 32% of the total area of each plate.

Each of the screens 42, 43 and 47-49 are about 0.020 inch (0.51 mm) thick and comprise forty square mesh screen of 0.010 inch (0.25 mm) diameter, 300 Series stainless steel wire. The screens 40 and 41 are each formed of 0.013 inch (0.33 mm) thick thirty-eight square mesh screen of 0.0065 inch (0.017 mm) diameter stainless steel wire, the rims providing an overall height of about 0.039 inch (1.0 mm).

The inside diameter of the housing shell shown in the specific exemplary embodiment in the drawings is 0.816 inch (21 mm) and the overall length of the shell is about 0.875 inch (22.2 mm), each of the spacers has a thickness of 0.030 inch (0.76 mm) and the diameter of the flow passage defined by the inside surfaces of the spacer rings is about 0.625 inch (16 mm).

It should be noted that all of the dimensions and other specific data presented here are exemplary only and are in no way intended to limit the scope of the invention; other dimensions, component parameters, materials, and so forth, which will provide the same or substantially the same or equivalent results, will be apparent to the skilled artisan based on the description herein.

Turning now to the portion of the device above the upper or upstream surface of the flow-limiting plate 30, the combination of a wire screen 60 and perforated disk 62 rest on a ledge 64 formed as part of the upper cartridge 14. The screen 60 and disk 62, which are identical in all respects to those already described, are preferably in contact with each other as best seen in FIG. 1. The screen 60, however, is spaced from the uper surface of the flow limiting plate and according to the specific example under consideration that separation may be of the order of 0.028 inch (0.71 mm). Overlying the combination of the screen 60 and disk 62 is a cone screen 66 serving principally as a filter element. A plastic ring 68 for retaining the cone screen 66, perforated disk 62 and wire screen 60 against the ledge 64, and a rubber gasket 70 for providing an appropriate seal with the spout, complete the attachment assembly.

Because it is extremely difficutl to precisely control the diameters of a large number of orifices such as the thirty-six (36) orifices 32 in the flow-limiting plate 30, a cumultive flow rate error large enough to cause the flow rate to fall outside the permissible range can and often does occur. One of the objects of this invention is to overcome that problem. In this connection, the nominal diameter of the orifices 32 is so chosen that the flow rate through those orifices (in the absence of the trimming orifice 36) will provide a flow rate that in all instances will be well below the lower limit of the permissible flow rate range. The diameter of the trimming orifice 36 is then selected to provide a total flow rate through the spout attachment that falls within the predetermined flow range. It has been found that once this size has been determined for a given nominal size of the orifices 32, a high degree of repeatability and precision in flow rate is obtained during production. Depending upon the parameters involved, the diameter of the trimming aperture may be smaller than, equal to or somewhat larger than the remaining orifices 32. It will be seen that this object is achieved by virtue of the fact that the diameter of the single center hole is subject to precise control whereas the sizes of the remaining orifices 32 will rarely if ever be uniform because of uncontrollable variations between the sizes of the numerous drills or mold pins that are required to form the holes.

The trimming orifice 36 furnishes such precise control over total flow rate that its size can be chosen to provide a total flow rate that reliably and reproducibly falls just within the low end of the permissible flow range. Since noise increases rapidly with flow rate, this feature contributes significantly to minimizing noise.

Figure 6:
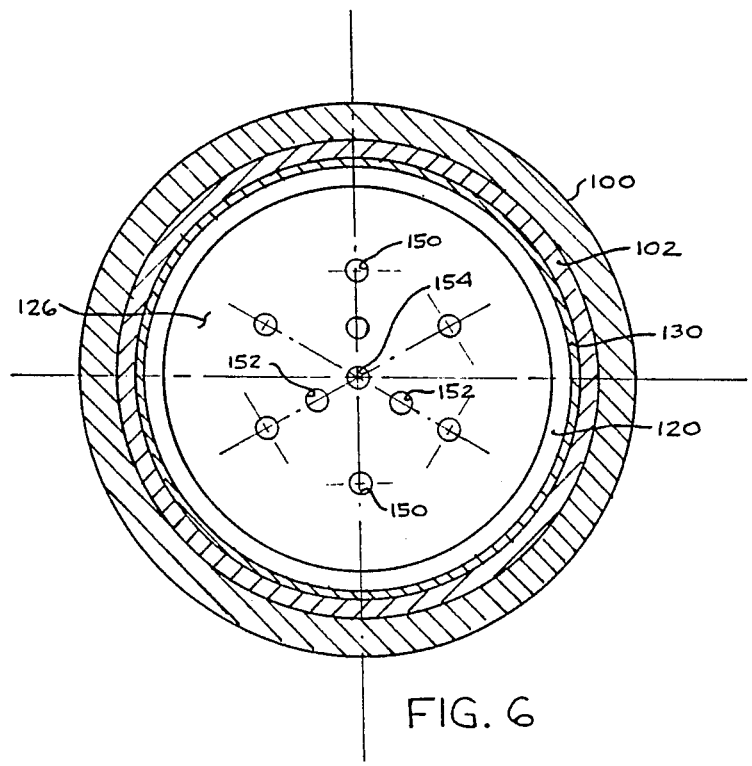
FIG. 6 is a transverse cross-section of the device shown in FIG. 5 as seen along plane 6—6.

Turning now to FIGS. 5 and 6, there is shown an alternative form of the invention which, although embodying the same basic principles as the first example of the invention discussed above, has fewer elements and is accordingly shorter in overall length. This compact or low profile design includes an outer, cylindrical shell 100 enclosing a one-piece cartridge 102 defining a flow passage 104 with an inlet or upstream end 106 and an outlet or downstream end 108. The shell 100 is provided with external threads 110 adjacent the inlet end for coupling the attachment to a spout faucet. A rubber gasket 111 provides the necessary seal. Formed in the inner wall of the cartridge 102 near the inlet end thereof is an annular grove 112 and a ledge 114 just below the grove. The cartridge moreover has an inwardly-directed flange 116 at the outlet end of the flow passage.

Seated on the ledge 114 and extending across the flow passage is a perforated disk 118. An insert ring 120 generally in the shape of an inverted T rests on the perforated disk 118 and supports a perforated disk 122, a wire mesh screen 124 and a flow-limiting plate 126. As shown in FIG. 5, the disks 118 and 122 are spaced-apart while the screen 124 is sandwiched between and in engagement with the flow-limiting plate 126 and the disk 122. Accordingly, the screen 124 is in contact with the downstream surface of the flow-limiting plate 126 and this relationship, as already stated, materially reduces noise generated by the stream.

Above the flow-limiting plate is a cone filter screen 128. The combination of elements comprising the perforated disks 118 and 122, the ring insert 120, the screen 124, the flow-limiting plate 126 and cone screen 128 is held permanently in place by a lock ring 130 having a tapered projection 132 which is forced into the groove 112 during fabrication of the spout attachment. Thus, this embodiment of the invention is not intended for disassembly after the lock ring 130 is pressed into place, the ring 130 effectively preventing any tampering with the spout attachment once it is manufactured.

Seated on the flange 116 at the outlet end of the cartridge 102 is a series of five spaced-apart wire mesh screens 140-144 extending across the flow passage 104. The uppermost screen 140 of this series of screens has a down-turned rim 140*a* while the remaining screens have up-turned rims 141*a*-144*a*. These rims provide the appropriate spacings between the screens 140-144 and by means of their frictional engagement with the inner wall of the cartridge 102 hold the screens firmly in place within the cartridge. Lastly, a perforated disk 146 is held in engagement with the upper surface of the screen 141 by means of a press fit within the up-turned rim 141*a*. The dimensions, spacings and other characteristics of the disks and screens that have been described will be obvious to workers skilled in the art; by way of example, the dimensions, spacings and other characteristics of these elements may be the same or similar to those utilized in connection with the first embodiment of the invention.

With reference now to FIG. 6 there is shown a plan view of the flow-limiting plate 126. The plate 126 has an outer circle of six flow-limiting orifices 150 and an inner circle of three flow-limiting orifices 152 centered on a trimming orifice 154. The functions of these orifices have already been described in connection with the first embodiment.

The spout attachment of the invention is designed to provide quiet service with a closely controlled flow rate within a narrow predetermined flow range which, for example, may be established by ordinance or building code. such ordinances or codes may also set a noise level limit for a given operating pressure. For example, a particular class or category of flow regulator may be required to limit flow to between about 3.6 and 4.0 gallons per minute at three (3) bars (13.5 to 15 liters per minute), a range of only 0.4 gpm (1.5 liters per minute), and not generate noise exceeding 20 db at about three (3) atmospheres. As far as is known, this invention provides for the first time a spout attachment capable of meeting all of these stringent requirements in a reliable, reproducible fashion, thereby lending itself to mass production with attendant cost savings.

Although a spout attachment in accordance with the invention has been described and illustrated for the purpose of enabling a person of ordinary skill in the art to make and use the invention, it will be appreciated that the invention is not limited thereto. Accordingly, any modifications, variations or equivalent arrangements within the scope of the appended claims should be considered to be within the scope of the invention.

What is claimed is:

1. A spout attachment comprising:
   a generally cylindrical housing having an inlet end adapted for coupling to a spout and an outlet end, said housing defining a flow passage connecting said ends;
   a flow-limiting plate disposed across said flow passage near the inlet end, the plate having a plurality of flow-limiting orifices of predetermined diameter, the plate further including a flow-trimming orifice having a diameter selected to place the flow rate of the spout attachment within a selected portion of a predetermined flow range;
   a first and a second series of spaced wire screens disposed across said flow passage downstream of said flow-limiting plate; and
   a series of spaced, perforated disks disposed across said flow passage between said first and second series of wire screens, said screens and disks arresting the flow velocity and providing a more uniform velocity profile across the flow passage.

2. A spout attachment, as defined in claim 1, in which:
   the selected portion of said flow range is the low end of said range whereby stream-generated noise is maintained at a minimum.

3. A spout attachment, as defined in claim 1, in which:
   the first series of spaced screens includes a screen immediately adjacent the downstream surface of the flow-limiting plate thereby reducing noise generated in the vicinity of the orifice exits.

4. A spout attachment, as defined in claim 3, in which:
   said last-mentioned screen is in contact with the downstream surface of the flow-limiting plate.

5. A spout attachment, as defined in claim 1, which includes:
   the combination of at least one perforated disk and at least one screen disposed across the flow passage upstream of said flow-limiting plate.

6. A spout attachment, as defined in claim 5, in which:
   said upstream screen is disposed proximate the upstream surface of the flow-limiting plate and is positioned between said plate and the upstream perforated disk.

7. A spout attachment, as defined in claim 1, in which:
   said first series of wire screens comprises four screens, one of the screens being disposed immediately adjacent the downstream surface of the flow-limiting plate;
   the second series of wire screens comprises three screens adjacent the outlet end of said housing; and
   the series of perforated disks comprises three disks, said screens and disks being substantially uniformly spaced apart from each other.

8. A spout attachment, as defined in claim 1, in which:
   the trimming orifice is located in the center of the flow-limiting plate and the plurality of orifices in the flow-limiting plate comprise circular arrays of said orifices concentric with said trimming orifice.

9. A low noise, flow-limiting, laminar stream water spout attachment comprising:
   a generally cylindrical housing having an inlet or upstream end adapted to be coupled to a spout, and an outlet or downstream end, said housing defining a flow passage connecting said ends;
   a flow-limiting plate disposed across said flow passage near the inlet end, the plate having an upstream facing surface, a downstream facing surface and a plurality of flow-limiting orifices of predetermined diameter;
   a screen disposed across said flow passage and in contact with the downstream surface of the flow-limiting plate;
   a plurality of spaced-apart screens disposed across said flow passage downstream of said first-mentioned screen; and
   a plurality of spaced-apart perforated disks disposed across said flow passage between said first-mentioned screen and said plurality of spaced-apart screens, said screens and perforated disks arresting the flow velocity and providing a more uniform stream velocity profile across the flow passage.

10. A spout attachment, as defined in claim 9, in which:
the first-mentioned screen has a downstream facing surface and a first one of said perforated disks engages said downstream surface of said first-mentioned screen; and
the plurality of spaced-apart screens includes an upstream screen having an upstream-facing surface and a second one of said perforated disks engages said upstream-facing surface of said upstream screen.

11. A spout attached, as defined in claim 10, in which:
said plurality of perforated disks includes a third perforated disk disposed between said first and second perforated disks.

12. A spout attachment, as defined in claim 11, which includes:
a screen disposed across said flow passage between, and spaced-apart from, said second and third perforated disks.

13. A spout attachment, as defined in claim 9, in which:
said flow-limiting plate includes a flow-trimming orifice having a diameter selected to place the flow rate of the spout attachment within the low end of a predetermined flow rate range whereby stream-generated noise is minimized.

14. A low noise, flow-limiting, laminar stream water spout attachment comprising:
a generally cylindrical housing having an inlet end adapted to be coupled to a spout, and an outlet end, said housing defining a flow passage connecting said ends;
a flow-limiting plate disposed across said flow passage near the inlet end, the plate having a plurality of flow-limiting orifices of predetermined diameter;
a first and a second series of spaced screens disposed across said flow passage downstream of said flow-limiting plate; and
at least one perforated disk disposed across said flow passage between said first and second series of screens, said screens and said at least one perforated disk arresting the flow velocity and providing a more uniform velocity profile across the flow passage.

15. A spout attachment, as defined in claim 14, in which:
the flow-limiting plate includes a flow-trimming orifice having a diameter selected to place the flow rate of the spout attachment within a selected portion of a predetermined flow rate range.

16. A spout attachment, as defined in claim 15, in which:
the selected portion of said flow range is the low end of said range whereby stream-generated noise is minimized.

17. A spout attachment, as defined in claim 14, in which:
the first series of spaced screens includes a screen in contact with the downstream surface of the flow-limiting plate.

18. A spout attachment, as defined in claim 14, in which:
the first series of screens comprises two screens, one of said screens being in contact with the downstream surface of the flow-limiting plate, a pair of perforated disk being disposed across said flow passage between said last mentioned two screens, one of said pair of disks being in contact with the downstream surface of the screen that is in contact with the lower surface of the flow-limiting plate.

19. A spout attachment, as defined in claim 14, in which:
said second series of screens includes at least three spaced screens.

20. A spout attachment, as defined in claim 19, in which:
the said at least one perforated disk is in contact with the upstream surface of the uppermost screen of the second series of screens.

21. A low noise, laminar stream, flow-limiting spout attachment comprising:
a generally cylindrical housing having an inlet end adapted for coupling to a spout and an outlet end, said housing defining a flow passage between said ends;
a flow-limiting plate supported by said housing and disposed across said flow passage near the inlet end, the plate having circular arrays of flow-limiting orifices, said plate further having an upstream surface and a downstream surface;
a first series of wire screens supported by said housing and extending across said flow passage downstream of said flow-limiting plate, said first series comprising four, substantially equally spaced screens, one of said screens being disposed across and in contact with the downstream surface of the flow-limiting plate;
a second series of wire screens supported by said housing and extending across said flow passage adjacent said outlet end, said second series comprising three, substantially equally spaced screens;
a series of three substantially equally spaced perforated disks supported by said housing and extending across said flow passage, said series of disks being disposed intermediate said first and second series of screens, the spacings between adjacent screens, between adjacent disks and between adjacent series of screens and disks being substantially the same; and
the combination of one perforated disk and one wire screen supported by said housing and extending across said flow passage upstream of said flow-limiting plate, said upstream disk and screen being in contact with each other, said upstream screen confronting the upstream surface of the flow-limiting plate and being spaced therefrom.

22. A spout attachment, as defined in claim 21, in which:
said flow-limiting plate includes a central flow-trimming orifice, said circular arrays of orifices by themselves providing a flow rate below a predetermined flow range, the diameter of said trimming orifice being selected to increase the overall flow through said flow passage to a rate within the low end of said range.

23. A low noise, laminar stream, flow-limiting spout attachment comprising:
a generally cylindrical housing having an inlet end adapted for coupling to a spout, and an outlet end, said housing defining a flow passage between said ends;

a flow-limiting plate supported by said housing and disposed across said flow passage near the inlet end, the plate having flow-limiting orifices, said plate further having an upstream surface facing said inlet end and a downstream surface facing said outlet end;

a screen supported by said housing and disposed across said flow passage in contact with the downstream surface of the flow-limiting plate;

a perforated disk supported by said housing and extending across said flow passage in contact with the downstream surface of the first mentioned screen;

a pair of spaced-apart perforated disks supported by said housing and extending across said flow passage, said pair of perforated disks being downstream of and spaced-apart from said first mentioned perforated disk;

a second screen disposed between the spaced-apart from said pair of perforated disks; and a series of spaced-apart wire screens supported by said housing and extending across said flow passage downstream of said pair of perforated disks, the upstream screen of said series of screens being in contact with said downstream one of said pair of perforated disks.

24. A spout attachment, as defined in claim 22, in which:

the flow-limiting orifices are arranged in circular arrays, said flow-limiting plate including a central flow-trimming orifice, said circular arrays of orifices by themselves providing a flow rate below a predetermined flow range, the diameter of said trimming orifice being selected to increase the overall flow through said flow passage to a rate within the low end of said range.

* * * * *